Patented Nov. 30, 1937

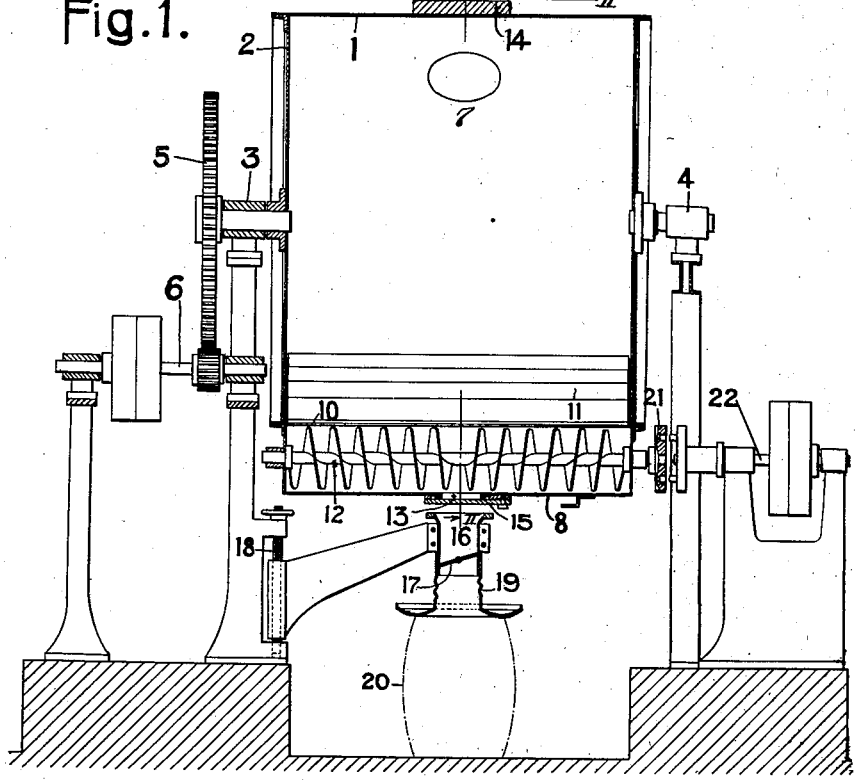
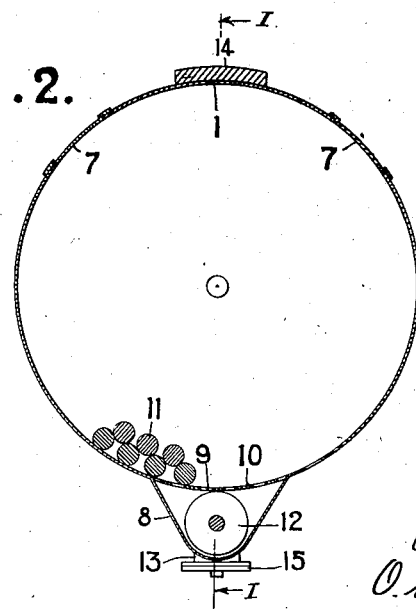

2,100,599

UNITED STATES PATENT OFFICE 2,100,599

MIXING AND GRINDING MILL

Oskar Schulthess and Casimir Theiler, Basel, Switzerland, assignors to the firm of Society of Chemical Industry in Basle, Basel, Switzerland Application July 24, 1934, Serial No. 736,753
In Switzerland August 4, 1933

3 Claims. (Cl. 83—9)

Grinding and mixing drums suffer from the disadvantage that when they are being emptied by means of hand shovels or the like the operators are exposed to injury by the production of dust. This is particularly the case when either dyestuffs or materials having an irritating effect are being ground or mixed.

Efforts have been made in various directions to overcome this objection. The mixing drum has been built within an outer casing capable of being closed and has been emptied by substituting a sieve for the cover of the drum and then rotating the mill. From the receiver, conically shaped at its lower part, the discharged material flows into the conveyer. It has also been proposed to eject the contents of the grinding and mixing drum by means of a current of air, produced by a vacuum pump, ejector or the like in a separate suction pipe, into bins or directly into the conveyer. This so-called vacuum discharge requires, in addition to a suction installation, special dust filters and very careful supervision, incurring high capital and working costs. Similar conditions prevail when compressed air is used as the conveying agent.

Various constructions having axial charging and discharging of the drum are known which also are intended for dust-free discharge. Their high price, however, stands in the way of their general use. For the most part they do not combine with the mixing effect a grinding by means of balls or rollers, such as to produce the desired appearance, the so-called aspect, in the goods ground. Known mixing machines having axial discharge which do serve for simultaneous mixing and grinding have the disadvantage that, in consequence of their internal construction, all the parts are not accessible for cleaning and are thus not well suited for frequent change of the kind of goods ground.

Even the known trough and shovel mixers, which combine with the mixing effect a certain grinding action by means of rollers rolling on the peripheral surfaces of the walls and the stirring arms, have only a very limited sphere of application; in such constructions the rotating axle of the stirrer acting as a conveyer device for automatic discharge is journalled co-axially with the stationary cylindrical drum.

The present invention consists in a mixing mill for dust-free discharge having arranged on the wall of its drum, which may be of any shape, a rotary conveyer device imparting movement to the ground material; this conveyer device, for instance a conveyer worm, a stirrer with inclined blades or the like, may be contained in a trough formed in the peripheral wall of the drum and communicating with the interior of the drum and with the space outside the mill by means of at least one opening in each case. It may be driven in such a manner that it can be retained in motion both when the drum is stationary for the purpose of discharge and while the grinding and mixing is in progress for the purpose of enhancing the mixing effect. The conveyer device allows in addition to the combined mixing effect through radical and axial movement of the material being mixed, also a grinding action by means of rollers, balls or the like. This united grinding and mixing is of great importance for obtaining the so-called aspect of dyestuffs. A preferred form of the invention is exemplified in the accompanying diagrammatic drawings by a mixing mill having a cylindrical drum.

Fig. 1 shows a vertical axial section according to line 1—1 of Fig. 2 through the mixing mill having a conveyer worm adapted to be driven by coupling with a counter-shaft.

Fig. 2 is a cross section through the mill according to line II—II of Fig. 1.

Figure 3:
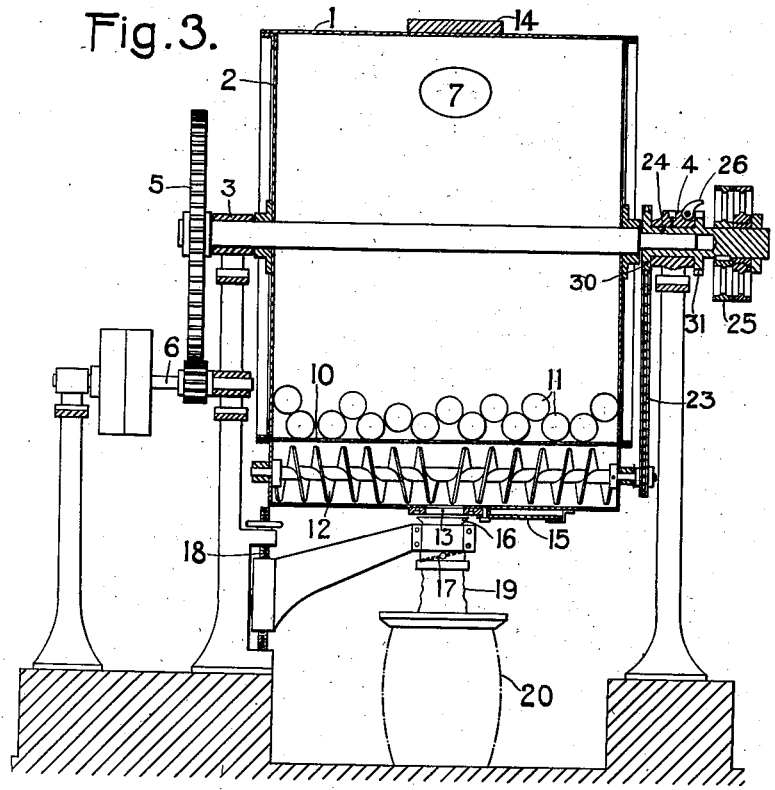
Fig. 3 shows in axial section a like mill in which the conveyer worm is driven by a chain gear from one end of the rotary axle of the drum, the latter being driven at the opposite end.

Referring to Figs. 1 and 2, the peripheral wall 1 of the drum and the end walls 2 are carried on trunnions which rotate in bearings 3 and 4. The drum is driven through the gear wheel 5 from the shaft 6. At a part of the drum, preferably at a distance of about 120° from the manholes 7, the peripheral wall of the drum is shaped throughout its length in the form of a trough 8. The cylindrical surface at this part of the drum may be continued in the form of bars 10 at such a distance from each other that when grinding bodies 11 are used these cannot become jammed between the bars and cannot project through the spaces into the conveyer trough. In the ends of the trough-shaped portion 8 there is journalled a conveyer worm 12. 13 is a discharge opening. The worm conveyer is right-handed as to one part of its length and left-handed as to the other part, so that the material under treatment, which falls through the spaces 9 between the bars 10, is always conveyed towards the discharge opening.

A simple construction of the trough 8 at a part of the peripheral wall 1 and the arrangement of suitable bars 10 permit the use of grinding bodies 11, so that a simultaneous mixing and grinding is produced.

When the mixing process is not to be accompanied by the use of grinding bodies, such as balls or rollers, the spaces 9 may be enlarged as may be desired, or the bars 10 may be omitted.

Diametrically opposite the conveyer worm 12 the drum may carry a counter-weight 14 in order to balance the conveyor device.

When the grinding and mixing process is completed, the mill is brought into the position in which the discharge opening is at the lowest point. In this position the cover 15 in the discharge opening registers with a receiving funnel 16 carried by an arm adapted to swing on a screw spindle 18. The funnel has a closing valve 17 and below this is connected by means of a flexible pipe 19 with the packing cask 20. The cover 15 is now swung aside and the same time the funnel 16 is pressed against the discharge opening 13. The conveyer worm 12 is now connected by means of a coupling 21 with a driven shaft 22. The worm thus set in rotation discharges the drum, for the most part automatically, in correspondence with the angle of repose of the material under treatment. Through the manholes 7 there may now be introduced suitable tools, such as shovels or brooms, whereby the rest of the contents can easily be pushed into the conveyer trough to be discharged by the worm.

Referring to Fig. 3, the worm 12 is here driven from the axle of the drum when this is set in rotation by the drive 5, 6. One end of the worm 12 carries a pinion over which passes a chain 23 running over a chain wheel 30 on a rotary bushing 24 surrounding the axle of the drum, said bushing 24 carrying the driving pulley 25 to which is associated the usual idle pulley. The axle of the drum is freely rotatable within the bushing 24 which is made in one piece with said chain wheel 30 and a notched disk 31 with which cooperates a locking latch 26 to lock the bushing 24 against rotation. When, during the mixing and grinding operation, the rotary bushing 24 is locked by the latch 26 the driving chain 23 rolls on the stationary chain wheel 30 of the bushing 24 so that during the rotation of the mill the conveyer worm is set in motion. The material under treatment is thus subjected to a conveying movement, that is to say an additional axial mixing movement from the end plates 2 of the drum towards the middle thereof. This rotation of the worm during that of the mill ensures that no part of the material to be mixed remains in the trough 8 during the mixing and grinding and in this manner the desired mixing effect is enhanced.

For obtaining a still better mixing effect in the axial direction, the bushing 24 may be revolved by means of the driving pulley 25 while the mill is rotating. To allow this movement, the latch 26 will be disengaged from the notched disk 31. This is also the case when the drum 1 is at rest and the conveyer 12 is to be rotated about its own axis for discharging purposes.

Figure 4:
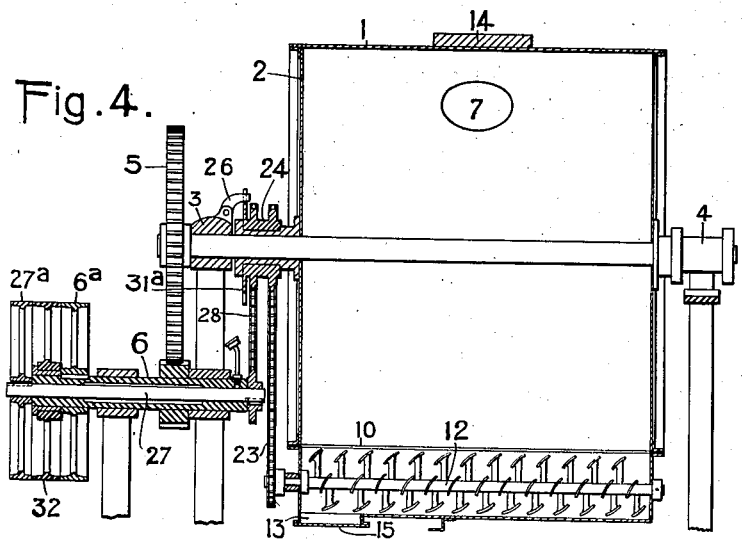
Fig. 4 shows in part longitudinal section a like drum in which the conveyer is a stirrer having inclined blades. In this case the conveyer is driven from the driven end of the rotary axle.

Fig. 4 illustrates a mode of driving the conveyer at that end of the drum at which the drive of the latter is situated. In this case the conveyer device 12 is a stirrer with inclined blades which may all be directed for discharging the material from the end of the conveyer trough.

A bushing 24 is mounted on the axle of the drum 1 and is driven by the chain 28 from a shaft 27 which is journalled in the hollow driving shaft 6 and carries a driving pulley 27ª. The shaft 6 carries the driving pulley 6ª, whilst an idle pulley 32 is located between the pulleys 6ª and 27ª. In this case also a latch 26 is provided to cooperate with a notched disk 31ª on the bushing 24 so as to allow locking thereof in order to produce a rotation of the conveyer device 12 from the drum during the grinding and mixing operation. On the other hand, the bushing 24 can also be unlocked and the pulley 27ª then be used for driving through shaft 27 and chain 28 the bushing 24 now unlocked so as to impart a direct drive to the conveyer device 12, independently of the drive of the drum through the shaft 6 and wheel 5, and also for discharging purposes when the drum is at rest.

The application of the conveyer device according to this invention is not limited to any particular form of mixing mill; thus it may be applied to mills having polygonal, oval or like cross-section at right angles to the axis of rotation; so also the drum may have any form in the direction of the axis of rotation, for example the form of a truncated cone. In such a case an angle of the polygon, for example, if desired somewhat rounded, may be used as the trough-shaped casing for accommodation of the conveyer device.

What we claim is:—

1. A mixing mill with arrangement for dust-free discharge of the mixed material, comprising a rotary mixing drum having an aperture for the exit of the goods in its peripheral wall, a trough located outside the periphery of said drum, and rigidly connected to said drum wall opposite said exit aperture, said trough extending longitudinally of the axis of said drum, said trough having a discharge opening in the wall thereof, a rotary conveyer within said trough to convey the material to said discharge opening, freely movable mixing and grinding bodies within said drum of larger dimension than said aperture thereby being prevented from entering said trough, driving means for rotating said drum together with said trough around the axis of said drum and independent driving means for rotating said conveyer about its own axis when the drum is at rest.

2. A mixing mill with arrangement for dust-free discharge of the mixed material, comprising a rotary mixing drum having an aperture for the exit of the goods in its peripheral wall, a trough located outside the periphery of said drum, and rigidly connected to said drum wall opposite said exit aperture, said trough having a discharge opening in the wall thereof, a rotary conveyer within said trough to convey the material to said discharge opening, driving means for rotating said drum together with said trough around the axis of said drum and independent driving means for rotating said conveyer about its own axis during the rotation of said drum as well as independently thereof when said drum is at rest.

3. A mixing mill with arrangement for dust-free discharge of the mixed material, comprising a rotary mixing drum having an aperture for the exit of the goods in its peripheral wall, a trough located outside the periphery of said drum, and rigidly connected to said drum wall opposite said exit aperture, said trough having a discharge opening in the wall thereof, a rotary conveyer within said trough to convey the material to said discharge opening, freely movable mixing and grinding bodies within said drum of larger size than said aperture so as to be prevented from passing therethrough, driving means for rotating said drum together with said trough around the axis of said drum and independent driving means for rotating said conveyer about its own axis during the rotation of said drum as well as independently thereof when said drum is at rest.

OSKAR SCHULTHESS.
CASIMIR THEILER.